United States Patent
Silverman et al.

(10) Patent No.: US 12,476,681 B2
(45) Date of Patent: Nov. 18, 2025

(54) PHYSICAL LAYER TRANSMIT MODE FOR IMPROVING SIGNAL-TO-INTERFERENCE ON BACKSCATTER MESSAGE

(71) Applicant: Cisco Technology, Inc., San Jose, CA (US)

(72) Inventors: Matthew A. Silverman, Shaker Heights, OH (US); Sivadeep Reddy Kalavakuru, Akron, OH (US); Ardalan Alizadeh, Milpitas, CA (US)

(73) Assignee: Cisco Technology, Inc.

( * ) Notice: Subject to any disclaimer, the term of this patent is extended or adjusted under 35 U.S.C. 154(b) by 154 days.

(21) Appl. No.: 18/459,519

(22) Filed: Sep. 1, 2023

(65) Prior Publication Data

US 2024/0380454 A1 Nov. 14, 2024

Related U.S. Application Data

(60) Provisional application No. 63/501,805, filed on May 12, 2023.

(51) Int. Cl.
*H04B 7/06* (2006.01)
*H04B 7/22* (2006.01)

(52) U.S. Cl.
CPC .............. *H04B 7/061* (2013.01); *H04B 7/22* (2013.01)

(58) Field of Classification Search
CPC .................................. H04B 7/061; H04B 7/22
See application file for complete search history.

(56) References Cited

U.S. PATENT DOCUMENTS

| | | |
|---|---|---|
| 2020/0412591 A1 | 12/2020 | Lopez et al. |
| 2021/0160713 A1 | 5/2021 | Yang et al. |
| 2021/0368439 A1 | 11/2021 | Karimaruthumkal et al. |
| 2021/0378037 A1 | 12/2021 | Katan Baf Nezhad et al. |
| 2022/0286228 A1 | 9/2022 | Song et al. |

OTHER PUBLICATIONS

Machine translation of KR-102181132-B1 (Year: 2020).*
International Search Report and Written Opinion for International Application No. PCT/US2024/028790, mailed Sep. 6, 2024, 12 Pages.
Wang, Hao et al. "Physical Layer Security of Two-Way Ambient Backscatter Communication Systems" Hindawi Wireless Communications and Mobile Computing, vol. 2022, Article ID 5445676, 10 pages https://doi.org/10.1155/2022/5445676; Mar. 29, 2022.

* cited by examiner

*Primary Examiner* — Jean B Corrielus
(74) *Attorney, Agent, or Firm* — Merchant & Gould P.C.

(57) ABSTRACT

Improving backscattering and, specifically, a physical Layer transmit mode for improving the Signal-to-Interference Ratio (SIR) of backscatter signals may be provided. A transmitter may determine a Backscatter Device (BKD) to send a transmission to for backscattering. The transmitter may determine a width of a puncture in the transmission. Next, the transmitter may transmit the transmission to the BKD. The transmitter may receive feedback from a receiver about decoding a backscattered signal generated using the transmission. The transmitter may adjust the width of the puncture for a subsequent transmission based on the feedback.

20 Claims, 5 Drawing Sheets

PHYSICAL LAYER TRANSMIT MODE FOR IMPROVING SIGNAL-TO-INTERFERENCE ON BACKSCATTER MESSAGE

RELATED APPLICATION

Under provisions of 35 U.S.C. § 119 (e), Applicant claims the benefit of U.S. Provisional Application No. 63/501,805, filed May 12, 2023, which is incorporated herein by reference.

TECHNICAL FIELD

The present disclosure relates generally to improving backscattering and specifically to providing a physical Layer transmit mode for improving the Signal-to-Interference Ratio (SIR) of backscatter signals.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
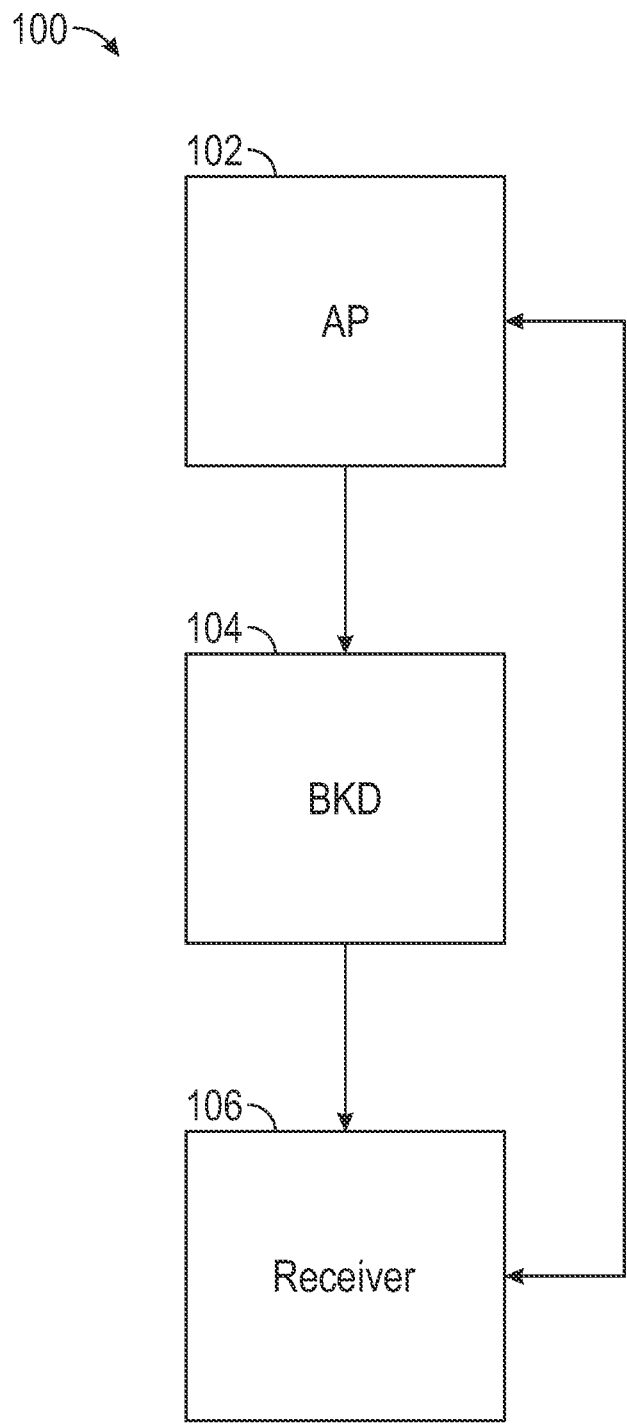
FIG. 1 is a block diagram of an operating environment for improving backscattering signals.

Improving backscattering and, specifically, a physical Layer transmit mode for improving the Signal-to-Interference Ratio (SIR) of backscatter signals may be provided. A transmitter may determine a Backscatter Device (BKD) to send a transmission to for backscattering. The transmitter may determine a width of a puncture in the transmission. Next, the transmitter may transmit the transmission to the BKD. The transmitter may receive feedback from a receiver about decoding a backscattered signal generated using the transmission. The transmitter may adjust the width of the puncture for a subsequent transmission based on the feedback.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In order to decrease the power requirements of devices such as Internet of Things (IoT) devices, Ambient Power (AMP) Backscatter devices (BKDs) may be used. AMP BKDs can use Radio Frequency (RF) signals to transmit data without a power source such as a battery or a connection to electricity. The AMP BKDs may use an antenna to receive a RF signal, use the RF signal for excitation (e.g., convert the RF signal into electricity), and use the power to modify and reflect the RF signal with data. In some examples, the AMP BKDs modulate or otherwise modify the RF signal to include encoded data. Other devices can receive a reflected RF signal transmitted by an AMP BKD to determine the data the AMP BKD is sending. AMP BKD operations may be described in documents and standards from the Institute of Electrical and Electronics Engineers (IEEE). For example, the IEEE AMP topic interest group and the IEEE 802.11 standard may describe the operations of AMP BKDs.

During the backscattering process, an Access Point (AP) may transmit a source signal the AMP BKD can use to perform backscattering (e.g., on/off keying such as Amplitude-Shift Keying (ASK)) by changing the source signal's reflective properties to encode data that another device can decode to determine the data. However, the backscattered signal may be lower power than the source signal (e.g., 60 dB lower). Therefore, the source signal may need to be a specific signal with high power to ensure the backscattered signal is powerful enough for devices to receive and decode to determine the data the BKD encoded on the backscattered signal. Thus, a narrow bandwidth signal may not provide sufficient power for backscattering. For example, a carrier narrower than 1 MHz may only provide a backscattered signal lower than 10 dBm at 2.4 GHz. Because the bandwidth of the source signal may need to be wider in order to achieve higher power, the transmitter may need to construct the source signal, so the encoded data is not drowned out or otherwise lost by the source signal.

FIG. 1 is a block diagram of an operating environment 100 for improving backscattering signals. The operating environment 100 may include an AP 102, a BKD 104, and a receiver 106. The AP 102 may transmit a signal (e.g., an excitation signal) to the BKD 104, and the BKD 104 may perform backscattering to encode data on the signal. The receiver 106 may receive the backscattered signal and decode the data to determine the data the BKD 104 sent. In some examples, the AP 102 may be the receiver 106 and receive the backscattered signal.

Network standards and regulations (e.g., as defined by IEEE standards) may limit the power the AP 102 may transmit signals at. For example, the AP 102 may have a maximum power of 20 GHz when transmitting signals. The AP 102 may therefore send wider bandwidth signals to the BKD 104 to increase the power while complying with network standards and regulations, so the BKD 104 may perform backscattering and produce a stronger backscattered signal the receiver 106 may receive. The increased power of the backscattered signal may improve the range the BKD 104 can reflect or otherwise send the backscattered signal, increase the reliability of sending the backscattered signal, increase the ability for the receiver 106 to decode the backscattered signal, and/or the like. However, the wider bandwidth of the original signal the AP 102 sends to the BKD 104 may decrease the Signal-to-Interference Ratio (SIR) of the backscattered signal because the encoded data may be drowned out by the original signal. Thus, the AP 102 may modify transmissions to avoid drowning out the backscattering the BKD 104 performs.

Figure 2:
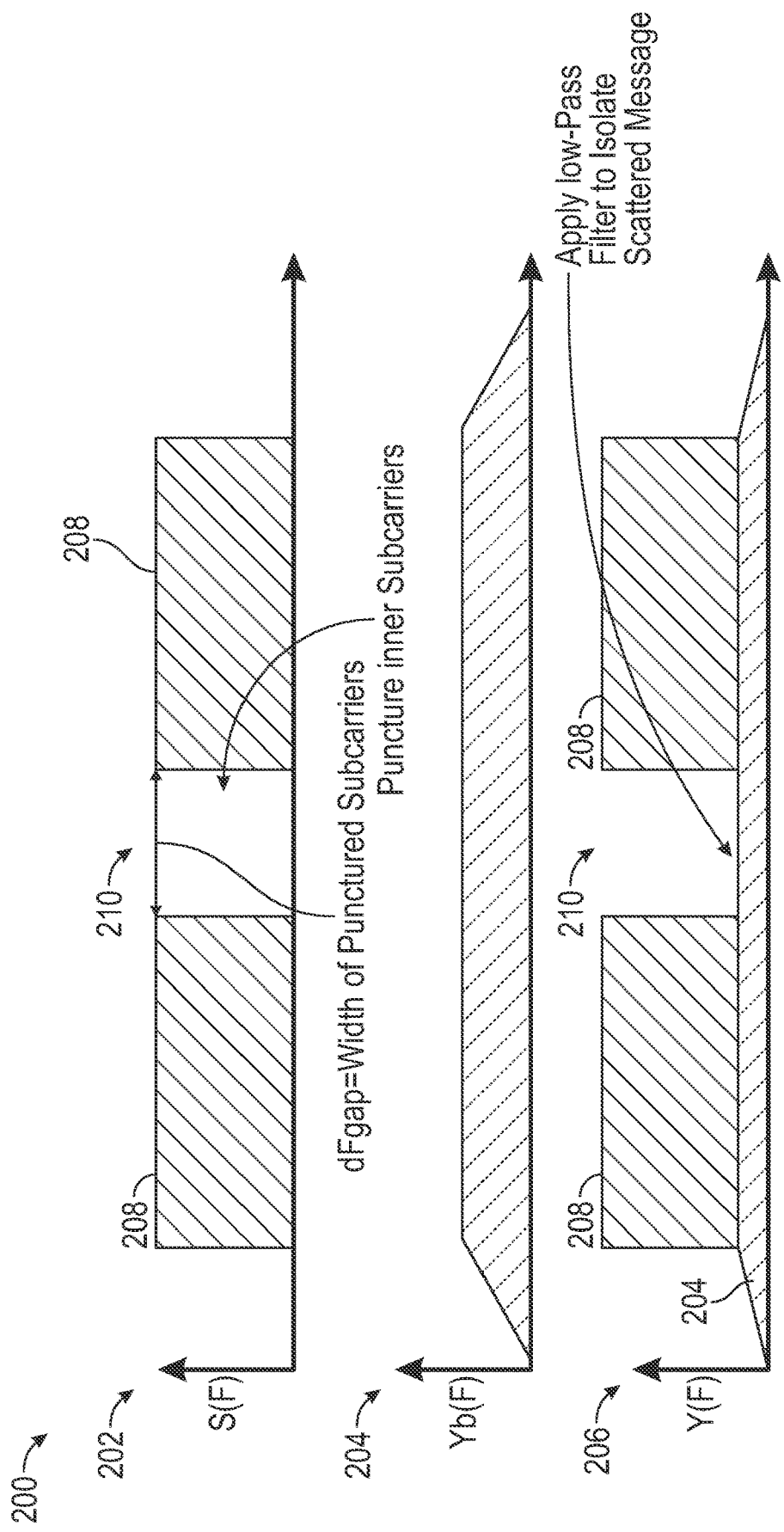
FIG. 2 is a block diagram of an improved backscatter signal.

FIG. 2 is a block diagram of an improved backscatter signal 200. The improved backscatter signal 200 may include an AP transmission 202, a backscattered signal 204, and an aggregate signal 206. The AP 102 may send the AP transmission 202 to the BKD 104 for backscattering. In response to receiving the AP transmission 202, the BKD 104 may perform backscattering and produce the backscattered signal 204. The aggregate signal 206 may include the AP transmission 202 and the backscattered signal 204, and the BKD 104 may reflect or otherwise send the aggregate signal 206 to the receiver 106 because the BKD 104 cannot separate backscattered signal 204 from the AP transmission 202.

The AP transmission 202 may be a wide band transmission to increase the power of the backscattered signal 204 and may include an AP signal 208 and a puncture 210. The puncture 210 may improve the SIR of the backscattered signal 204 at the position of the puncture 210, thereby enabling the receiver 106 to access the data encoded via the backscattered signal 204. For example, the puncture 210 may allow the receiver 106 to determine the backscattered signal 204 using a filter to isolate the backscattered signal 204 where the puncture 210 is positioned and SIR is therefore best.

The AP 102 may position the puncture anywhere in the data portion of the AP signal 208 (e.g., the data portion of a Physical Layer Protocol Data Unit (PPDU) as described by the IEEE 802.11 standard). For example, the AP 102 may position the puncture 210 at the lowest subcarriers in the data portion of the AP signal 208. With a puncture 210 position at the lowest subcarriers, the receiver 106 may access the backscattered signal 204 a low-pass-filter on the subcarriers for decoding and access of the data encoded via the backscattered signal 204.

The AP 102 may also determine the width of the puncture 210. The wider the puncture 210, the more the SIR may improve, but the more the backscattered signal 204 strength may reduce. The narrower the puncture 210, the more the backscattered signal 204 strength may improve, but the more the SIR may deteriorate. Thus, the AP 102 may determine the width of the puncture 210 based on balancing the improvements to the SIR and the backscattered signal 204 strength level. For example, the AP 102 may determine the narrowest puncture 210 possible that still allows the receiver to determine the data encoded via the backscattered signal 204 (e.g., sufficient backscattered signal 204 strength and SIR). Because the signal strength from backscattering may vary between BKDs, the AP 102 may determine different puncture widths for multiple BKDs.

Figure 3:
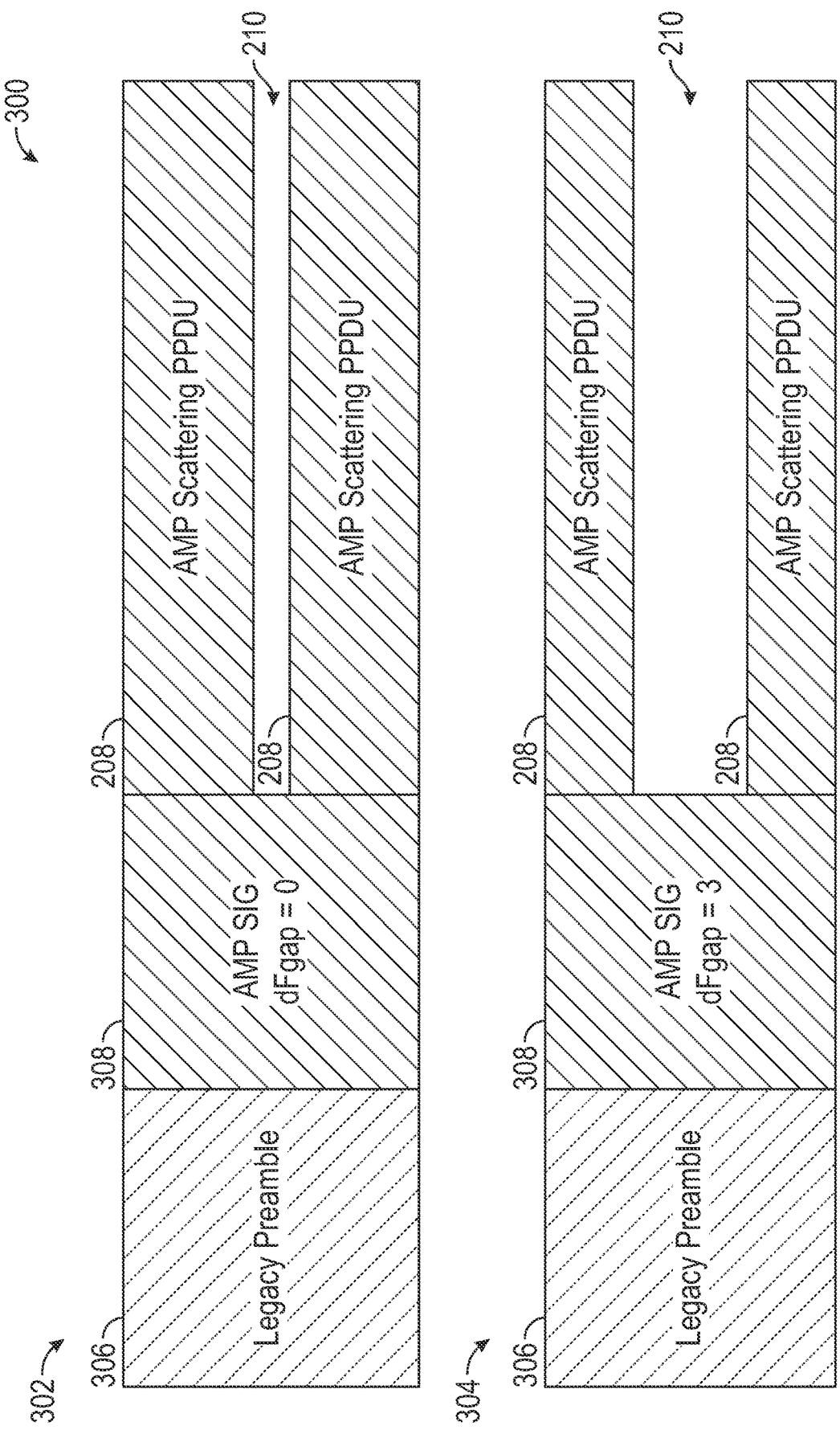
FIG. 3 is a block diagram of Physical Layer Protocol Data Units (PPDUs) for improving backscattering signals.

FIG. 3 is a block diagram of Physical Layer Protocol Data Units (PPDUs) 300 for improving backscattering signals. The PPDUs 300 include a first PPDU 302 and a second PPDU 304. The first PPDU 302 may include a preamble 306, a signal field 308, the AP signal 208, and the puncture 210. The second PPDU 304 may include the preamble 306, the signal field 308, the AP signal 208, and the puncture 210.

The preamble 306 may be a legacy preamble as described by the IEEE 802.11 standard and may include one or more fields such as a Legacy Short Training Field (L-STF), a Legacy Long Training Field (L-LTF), and a Legacy Signal Field (L-SIG). When device receives a L-STF, the device may determine to begin packet detection, perform automatic gain control, perform frequency offset estimation, perform initial time synchronization, and/or the like. When a device receives a L-LTF, the device may perform channel estimation, perform a more accurate frequency offset estimation compared to the estimation performed when the S-LTF is received, perform more accurate time synchronization compared to the estimation performed when the S-LTF is received, and/or the like. When a device receives a L-SIG, the device may determine packet information for the received configuration such as data rate, data length, transmission time, and/or the like. The preamble 306 may also indicate when the PPDUs are backscattering event transmissions (e.g., indicating the first PPDU 302 and the second PPDU 304 are backscattering event transmissions).

The signal field 308 may signal information about the associated PPDU. For example, the signal field 308 may include an indicator of the position and/or width of the puncture for the given PPDU. Two bits of the signal field 308 may indicate the puncture 210 width for example. The two bits having a value of zero may indicate a width of fourteen subcarriers, a value of one may indicate twenty-eight subcarriers, a value of two may indicate forty-two subcarriers, a value of three may indicate sixty subcarriers, etc. The first PPDU 302 signal field 308 may have the two bits set to zero, indicating the associated puncture 210 width is fourteen subcarriers. The second PPDU 304 signal field 308 may have the two bits set to three, indicating the associated puncture 210 width is sixty subcarriers.

Because the first PPDU 302 has a narrow puncture 210 width, the backscattered signal the BKD 104 may produce using the first PPDU 302 may have high signal power. However, the receiver 106 may not be able to separate the backscattered signal 204 from the AP transmission 202 to decode the data from the BKD 104 in some situations. Because the second PPDU 304 has a wide puncture, the backscattered signal the BKD 104 may produce using the second PPDU 304 may have a lower signal power, and the receiver 106 may be unable to receive the signal in some situations. However, the receiver 106 may be able to filter the second PPDU 304 to determine the backscattered signal (e.g., the backscattered signal 204) with the wide width of the second PPDU 304 puncture 210 improving the SIR of the backscattered signal.

The AP 102 may communicate with the receiver 106 when the receiver receives backscattered signals to determine whether the receiver can decode the data. The AP 102 may adjust the puncture 210 for subsequent signals based on the communications with the receiver 106. The receiver 106 may report to the AP 102 whenever the puncture 210 width is too narrow and decoding the data failed. Thus, the AP 102 may determine the puncture 210 width is wide enough when the receiver 106 does not send a notice, and the AP 102 may subsequently attempt to further narrow the puncture 210 width or maintain the puncture 210 width. The AP 102 may determine the puncture 210 width via communications with the receiver 106 based on desired network operation of the BKD 104 (e.g., no backscattering specifically performed to determine the puncture 210 width). Alternatively, the AP 102 may send multiple test AP transmissions 202 for the BKD 104 to perform test backscattering specifically to determine the ideal puncture 210 width.

The AP 102 may communicate with the receiver 106 to supply the receiver 106 with information about the puncture 210, such as the width. The AP 102 may include the communication via the aggregate signal 206 the receiver 106 receives, via the preamble 306 and the signal field 308 for example. The puncture 210 width may be static for all BKDs, set for a period of time for all BKDs, set by a codebook that details the widths the AP 102 may use and physical layer signals the AP 102 may use to indicate the used width, the network standards may define the widths the AP 102 may use, and/or the like. The AP 102 may set a value in the signal field 308 of excitation transmissions (e.g., the AP transmission 202 may include the preamble 306 and the signal field 308, and the aggregate signal 206 may therefor include the preamble 306 and the signal field 308) as described above.

The receiver 106 may operate using normal bandwidth filtering until the receiver 106 receives a transmission (e.g., a PPDU) that indicates the transmission is a backscattering event transmission (e.g., the aggregate signal 206) via the preamble 306 of the transmission. For the remainder of the backscattering event transmission, the receiver 106 may modify analog and digital baseband filters to focus filtering at the position of the puncture 210 according to the width to filter out the AP signal 208 and retain the backscattered signal 204 for decoding. Thus, the receiver 106 may first receive a transmission from the AP 102 indicating puncture 210 width, receive the aggregate signal 206, filter the aggregate signal 206 according to the puncture 210 width to isolate the backscattered signal 204 at the puncture 210, and attempt to decode the data encoded via the backscattered signal 204. If the receiver 106 is not able to decode the data, the receiver 106 may notify the AP 102 of the failure. The AP 102 may then adjust the puncture 210 width for subsequent AP transmissions 202. The receiver 106 may return operation to normal bandwidth filtering until the receiver 106 receives another backscatter event signal.

Figure 4:
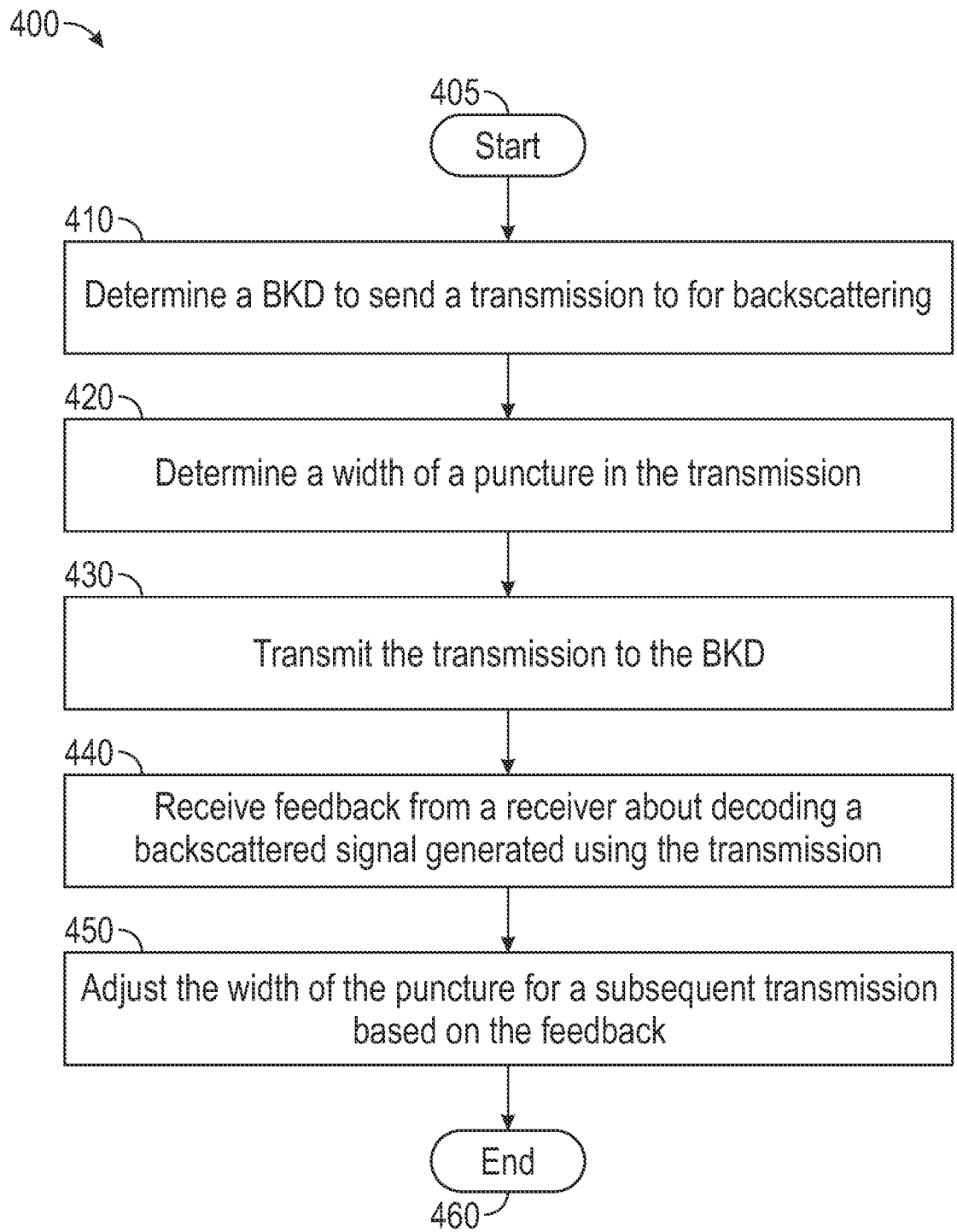
FIG. 4 is a flow chart of a method for improving backscattering.

FIG. 4 is a flow chart of a method 400 for improving backscattering. The method 400 may begin at starting block 405 and proceed to operation 410. In operation 410, a BKD may be determined to send a transmission to for backscattering. For example, the AP 102 may determine to send a transmission to the BKD 104 so the BKD 104 may perform backscattering.

In operation 420, a width of a puncture in the transmission may be determined. For example, the AP 102 may determine a width of the puncture 210 for the transmission (e.g., the AP transmission 202, the first PPDU 302, the second PPDU 304). The AP 102 may estimate an initial width of the puncture without using feedback, may use feedback from previous transmissions sent to the BKD 104, and/or use initial feedback the AP 102 receives from the receiver 106 after the associated with the receiver 106 decoding test backscattering signals generated using test transmissions the AP 102 sends to the BKD 104.

In operation 430, the transmission may be transmitted to the BKD. For example, the AP 102 may send the transmission to the BKD 104. In operation 440, feedback may be received from a receiver about decoding a backscattered signal generated using the transmission. For example, the AP 102 may receive feedback from the receiver 106 about the receiver 106 decoding the backscattered signal the BKD 104 generates. The feedback may indicate whether the receiver 106 successfully or unsuccessfully decoded the data the BKD 104 encoded on the backscattered signal. In some examples, the AP 102 may not receive a transmission from the receiver 106 when the receiver 106 successfully decodes the data. Thus, the feedback may be the absence of a transmission from the receiver 106, indicating the decoding was successful.

In operation 450, the width of the puncture may be adjusted for a subsequent transmission based on the feedback. For example, the AP 102 may adjust the width of the puncture based on the feedback the AP 102 receives from the receiver 106. When the feedback indicates the receiver 106 successfully decoded the backscattered signal, the AP 102 may narrow the width of the puncture or maintain the width of the puncture for the subsequent transmission. When the feedback indicates the receiver 106 did not decode the backscattered signal, the AP 102 may widen the width of the puncture for the subsequent transmission. The method 400 may conclude at ending block 460.

Figure 5:
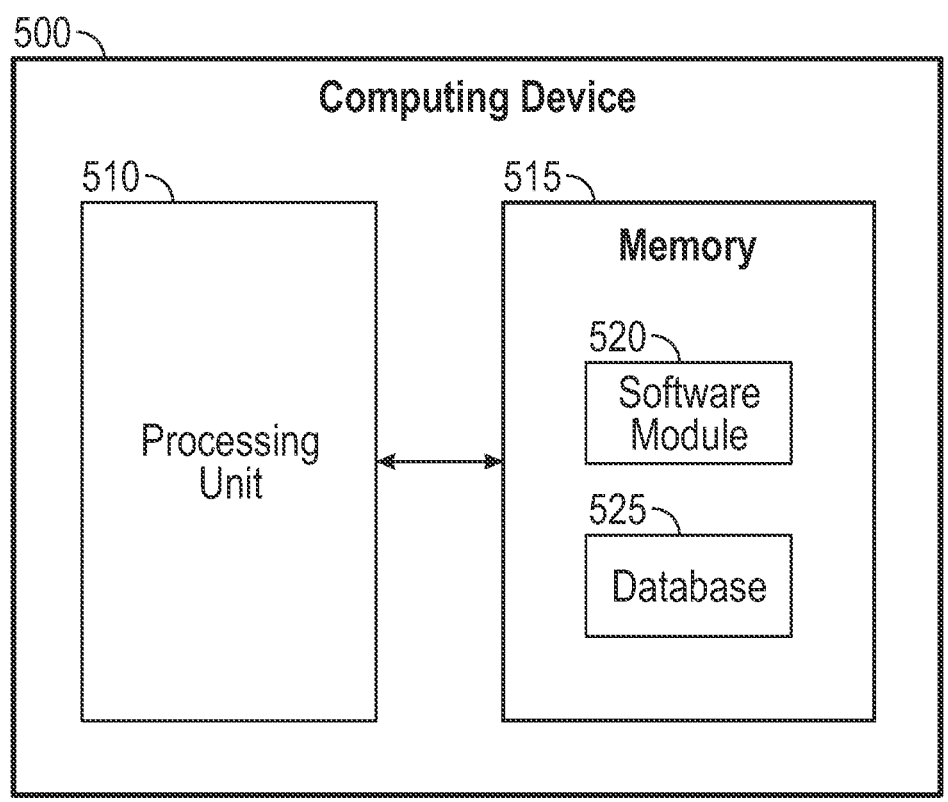
FIG. 5 is a block diagram of a computing device.

FIG. 5 is a block diagram of a computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for improving backscattering and specifically to providing a physical Layer transmit mode for improving the SIR of backscatter signals with respect to FIG. 1, FIG. 2, FIG. 3, and FIG. 4. Computing device 500, for example, may provide an operating environment for the AP 102, the BKD 104, the receiver 106, and the like. The AP 102, the BKD 104, the receiver 106, and the like may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   determining a Backscatter Device (BKD) to send a transmission to for backscattering;
   determining a width of a puncture in the transmission;
   transmitting the transmission to the BKD;
   receiving feedback from a receiver about decoding a backscattered signal generated using the transmission; and
   adjusting the width of the puncture for a subsequent transmission based on the feedback.

2. The method of claim 1, wherein the transmission comprises an indicator of the width of the puncture.

3. The method of claim 2, wherein the indicator is a value in a signal field, wherein the value being set to zero indicates the width is for fourteen subcarriers, the value being set to one indicates the width is twenty-eight subcarriers, the value being set to two indicates the width is forty-two subcarriers, and the value being set to three indicates the width is sixty subcarriers.

4. The method of claim 2, wherein the receiver filters an aggregate transmission including the backscattered signal based on the indicator for decoding the backscattered signal.

5. The method of claim 1, wherein the width of the puncture comprises any one of: (i) static for all BKDs, (ii) set for a period for all BKDs, (iii) set by a codebook detailing puncture widths for one or more BKDs including the BKD, (iv) or any combination of (i)-(iii).

6. The method of claim 1, wherein determining the width of the puncture comprises:
   transmitting multiple test transmissions to the BKD for test backscattering;
   receiving initial feedback from the receiver about decoding test backscattered signals generated using the multiple test transmissions; and
   determining the width of the puncture based on the initial feedback.

7. The method of claim 1, wherein adjusting the width comprises:

when the feedback indicates the receiver successfully decoded the backscattered signal, narrowing the width of the puncture or maintaining the width of the puncture for the subsequent transmission; and when the feedback indicates the receiver did not decode the backscattered signal, widening the width of the puncture for the subsequent transmission.

8. A system comprising:
a memory storage; and
a processing unit coupled to the memory storage, wherein the processing unit is operative to:
 determine a Backscatter Device (BKD) to send a transmission to for backscattering;
 determine a width of a puncture in the transmission;
 transmit the transmission to the BKD;
 receive feedback from a receiver about decoding a backscattered signal generated using the transmission; and
 adjust the width of the puncture for a subsequent transmission based on the feedback.

9. The system of claim 8, wherein the transmission comprises an indicator of the width of the puncture.

10. The system of claim 9, wherein the indicator is a value in a signal field, wherein the value being set to zero indicates the width is for fourteen subcarriers, the value being set to one indicates the width is twenty-eight subcarriers, the value being set to two indicates the width is forty-two subcarriers, and the value being set to three indicates the width is sixty subcarriers.

11. The system of claim 9, wherein the receiver filters an aggregate transmission including the backscattered signal based on the indicator for decoding the backscattered signal.

12. The system of claim 8, wherein the width of the puncture comprises any one of: (i) static for all BKDs, (ii) set for a period for all BKDs, (iii) set by a codebook detailing puncture widths for one or more BKDs including the BKD, (iv) or any combination of (i)-(iii).

13. The system of claim 8, wherein to determine the width of the puncture comprises to:
 transmit multiple test transmissions to the BKD for test backscattering;
 receive initial feedback from the receiver about decoding test backscattered signals generated using the multiple test transmissions; and
 determine the width of the puncture based on the initial feedback.

14. The system of claim 8, wherein to adjust the width comprises to:
 when the feedback indicates the receiver successfully decoded the backscattered signal, narrow the width of the puncture or maintaining the width of the puncture for the subsequent transmission; and
 when the feedback indicates the receiver did not decode the backscattered signal, widen the width of the puncture for the subsequent transmission.

15. A non-transitory computer-readable medium that stores a set of instructions which when executed perform a method executed by the set of instructions comprising:
 determining a Backscatter Device (BKD) to send a transmission to for backscattering;
 determining a width of a puncture in the transmission;
 transmitting the transmission to the BKD;
 receiving feedback from a receiver about decoding a backscattered signal generated using the transmission; and
 adjusting the width of the puncture for a subsequent transmission based on the feedback.

16. The non-transitory computer-readable medium of claim 15, wherein the transmission comprises an indicator of the width of the puncture.

17. The non-transitory computer-readable medium of claim 16, wherein the indicator is a value in a signal field, wherein the value being set to zero indicates the width is for fourteen subcarriers, the value being set to one indicates the width is twenty-eight subcarriers, the value being set to two indicates the width is forty-two subcarriers, and the value being set to three indicates the width is sixty subcarriers.

18. The non-transitory computer-readable medium of claim 16, wherein the receiver filters an aggregate transmission including the backscattered signal based on the indicator for decoding the backscattered signal.

19. The non-transitory computer-readable medium of claim 15, wherein the width of the puncture comprises any one of: (i) static for all BKDs, (ii) set for a period for all BKDs, (iii) set by a codebook detailing puncture widths for one or more BKDs including the BKD, (iv) or any combination of (i)-(iii).

20. The non-transitory computer-readable medium of claim 15, wherein determining the width of the puncture comprises:
 transmitting multiple test transmissions to the BKD for test backscattering;
 receiving initial feedback from the receiver about decoding test backscattered signals generated using the multiple test transmissions; and
determining the width of the puncture based on the initial feedback.

* * * * *